United States Patent [19]
Imai et al.

[11] Patent Number: 5,789,918
[45] Date of Patent: Aug. 4, 1998

[54] TEMPERATURE COMPENSATED DIFFERENTIAL TRANSFORMER AND A MEASURING DEVICE USING THE SAME

[75] Inventors: Katsunori Imai, Aichi-ken; Yuji Takahashi, Kariya, both of Japan

[73] Assignee: Toyoda Koki Kabushiki Kaisha, Kariya, Japan

[21] Appl. No.: 733,136

[22] Filed: Oct. 16, 1996

[30] Foreign Application Priority Data

Oct. 16, 1995 [JP] Japan ................ 7-266893

[51] Int. Cl.⁶ .................. G01B 7/00; G01B 5/08; H01F 21/06; H01F 27/28
[52] U.S. Cl. ............... 324/207.18; 33/551.1; 33/556; 324/207.12; 336/136; 336/179
[58] Field of Search .................. 324/207.12, 207.17, 324/207.18, 207.19, 224, 225; 318/656–658; 340/870.35, 870.36; 336/130, 136, 179, 30, 45, 55, 62; 33/550, 555.1, 556

[56] References Cited

U.S. PATENT DOCUMENTS

| | | |
|---|---|---|
| 3,308,411 | 3/1967 | Roshala ................ 336/179 X |
| 3,688,187 | 8/1972 | Loos ..................... 324/224 |
| 3,694,785 | 9/1972 | Chass ................... 336/179 X |
| 3,846,916 | 11/1974 | Moriya et al. . |
| 4,205,217 | 5/1980 | Araya et al. . |
| 5,032,785 | 7/1991 | Mathis et al. . |

FOREIGN PATENT DOCUMENTS

215335 9/1925 United Kingdom ........... 336/179

*Primary Examiner*—Gerard R. Strecker
*Attorney, Agent, or Firm*—Oblon, Spivak, McClelland, Maier & Neustadt, P.C.

[57] ABSTRACT

A differential transformer includes a primary coil for excitation and first and second secondary coils for detection which can be wound up on an outer surface of a bobbin made of a non-magnetic substance. In the bobbin, i.e., in a differential coil composed of the primary coil and the first and second secondary coils, a core is movably inserted in an axial direction thereof and is made of a magnetic substance. In the differential transformer, when AC current is applied on the primary coil, an induced voltage corresponding to a relative displacement between the core and the differential coil is generated, so that a size of a measured member can be measured by detecting the induced voltage. In the first and second secondary coils, a compound conducting wire is used, which includes two conducting wires which are different from each other in forms of a thermal coefficient of resistivity and are connected by a predetermined rate with regard to their length. Therefore, it is provided that the differential transformer can obtain a detection value corresponding to the relative displacement between the core and the differential coil regardless of a change of the ambient temperature.

4 Claims, 10 Drawing Sheets

TEMPERATURE COMPENSATED DIFFERENTIAL TRANSFORMER AND A MEASURING DEVICE USING THE SAME

BACKGROUND OF THE INVENTION

1. Field of the Invention

The present invention relates to a differential transformer which is capable of eliminating a measuring error due to changes in ambient temperature and a measuring device using the same. The present invention more particularly relates to a differential transformer which is capable of eliminating a measuring error in a relative displacement due changes in ambient temperature between a differential coil and a core and a measuring device using the same.

2. Description of the Background

Figure 1:
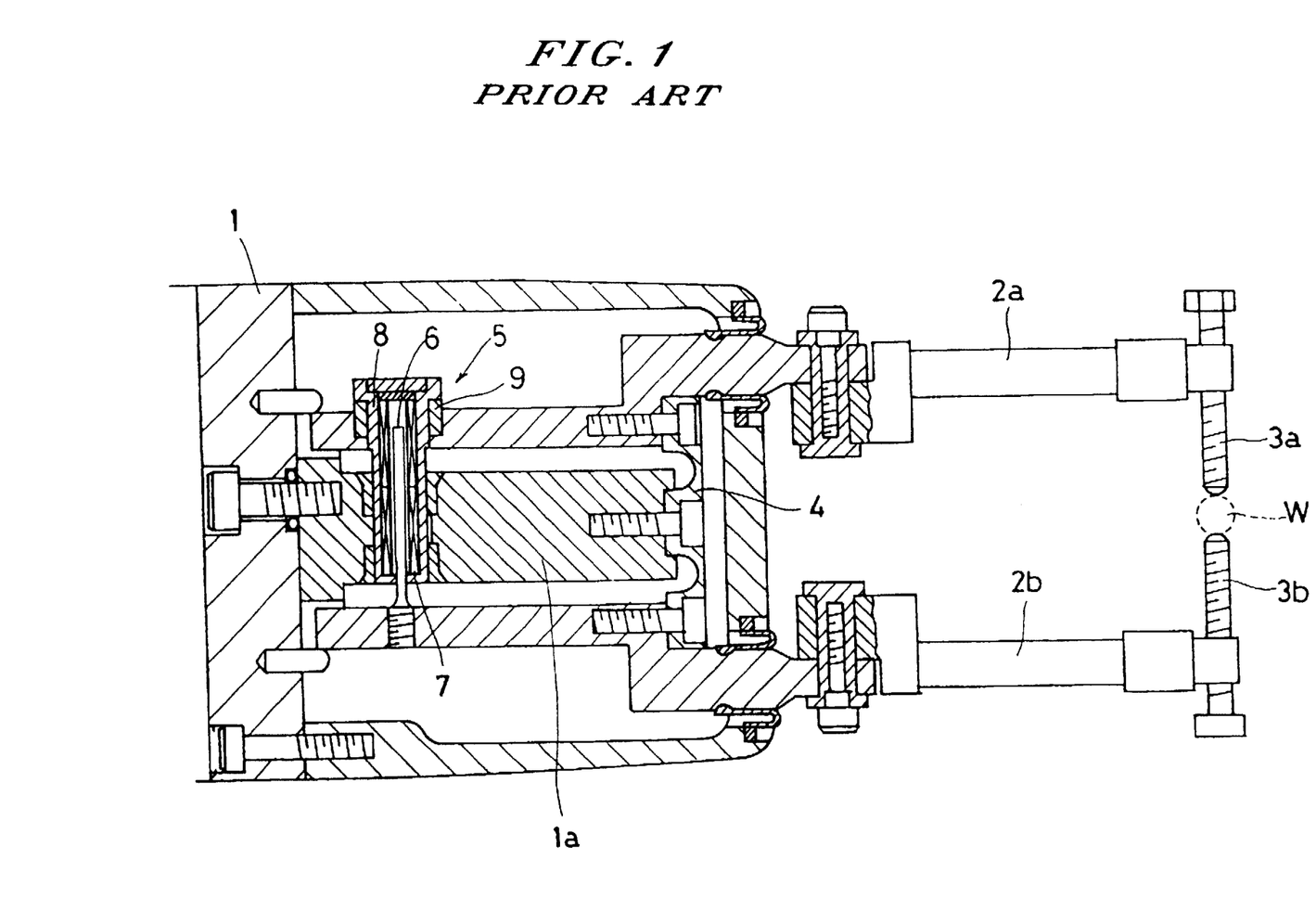
FIG. 1 shows a side cross-sectional view of a related measuring device.

In a related measuring device for measuring a diameter of a workpiece which is provided with machine tools such as a grinding machine, it is generally known to detect, by a differential transformer, a relative displacement between a pair of feelers which contact a workpiece in between. Moreover, the applicants have previously proposed a measuring device 10 which is capable of compensating for thermal displacement due to the change of the ambient temperature in unexamined Japanese publication No. 6-229704. As shown in FIG. 1, a pair of contact feelers 3a and 3b which contact an outer surface of a workpiece W are respectively provided with a pair of feelers 2a and 2b on both top portions thereof. The feelers 2a and 2b are movably supported by a body 1 of the measuring device through a leaf spring 4 fixed thereto. A differential transformer 5 is arranged at an end portion of the feelers 2a and 2b. The differential transformer 5 is composed of a core 6 made of a magnetic substance, a differential coil 7 into which the core 6 is inserted, and a bobbin 8 for supporting the differential coil 7. The core 6 is fixed to the lower feeler 2b, and the bobbin 8 winding the differential coil 7 is fixed to the upper feeler 2a through a spacer 9. Therefore, a relative displacement between the core 6 and the differential coil 7 is caused by the relative displacement between the feelers 2a and 2b, so that a change in the diameter of the workpiece W can be detected. Moreover, the spacer 9 which is inserted between the bobbin 8 and the feeler 2a is made of a material which has a coefficient of linear expansion (linear expansivity) so that it expands in the same direction and by the same amount as the core 6 does because of the thermal expansion.

Accordingly, when the core 6 expands in an axial direction of the core 6 due to the change of the ambient temperature of the measuring device, the spacer 9 expands in the same direction of the core 6 by the same amount, and the bobbin 8 supported at the spacer 9 is also moved in the same direction of the core 6 by the same amount, so that a relative displacement between the core 6 and the differential coil 7 is not generated. Therefore, a measuring error due to the thermal displacement can be canceled.

PROBLEMS TO BE SOLVED BY THE INVENTION

In the related measuring device as described above, the relative displacement between the core 6 and the differential coil 7 can be eliminated due to the thermal expansion. However, this device has a drawback in that the measuring error of the differential coil 7 itself cannot be eliminated due to changes in the ambient temperature as explained hereinafter.

Figure 2:
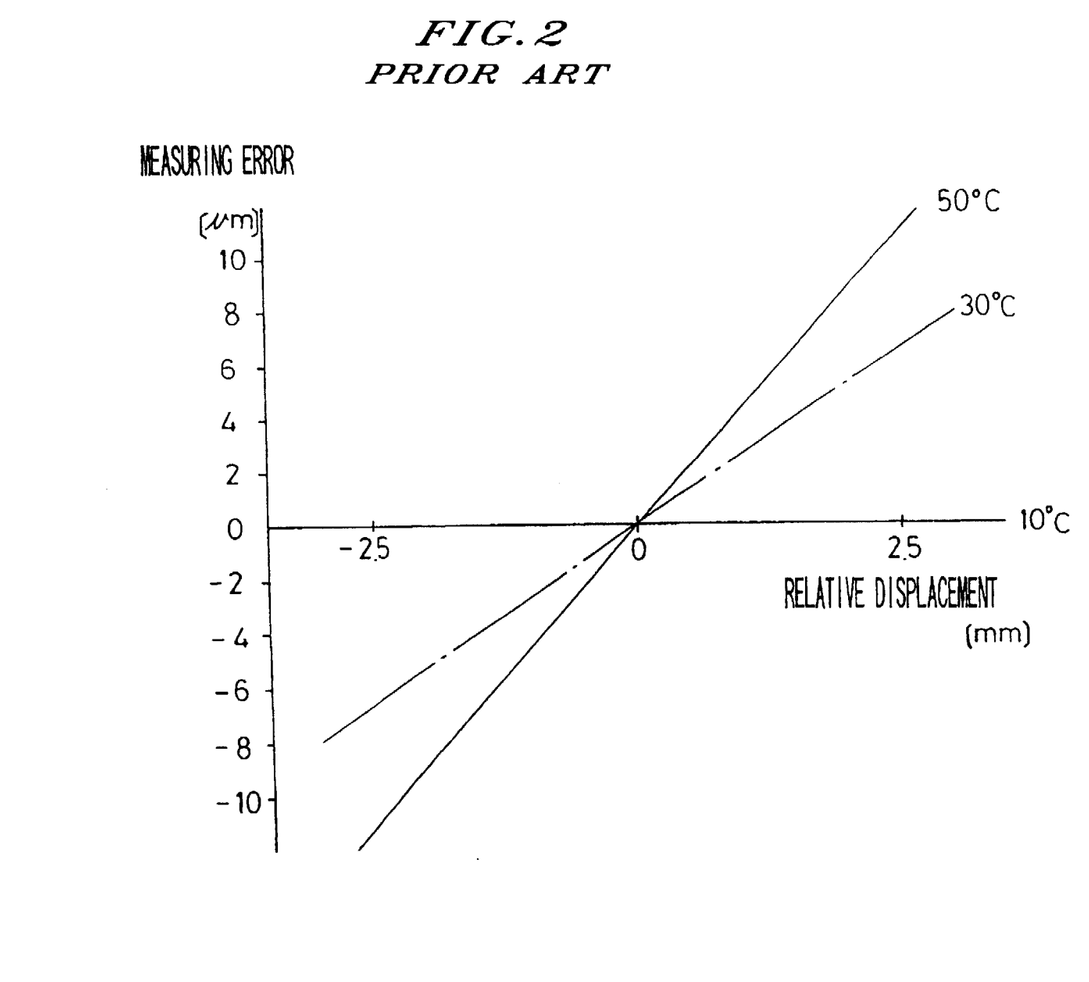
FIG. 2 is a characteristic graph showing a relationship between a relative displacement of a pair of feelers and a measuring error for two ambient temperatures around a measuring device.

Namely, it is generally known that a metallic material is characterized by changing resistivity as a function of ambient temperature. Moreover, a coil made by winding a conducting wire changes resistivity by the expansion of the cross-section and the length of the conducting wire due to changes in ambient temperature. In the case that both a primary coil for excitation and a secondary coil for detection of the differential coil 7 are made of an enamel-coated copper wire which has a thermal coefficient of resistivity of $4.3 \times 10^{-3}$ $\mu\Omega\cdot\text{cm}/°\text{C}$. in the temperature range of 0° C. to 110° C., the measuring error of the relative displacement between the core 6 and the differential coil 7 with respect to the differential transformer 5 is shown in FIG. 2 for two ambient temperatures. As understood in FIG. 2, the measuring error of the differential coil 7 increases as the ambient temperature rises and the relative displacement between the core 6 and the differential coil 7 increases as well. In other words, the measuring error is positive when the displacement between the core 6 and the differential coil 7 increases. On the other hand, the measuring error is negative when the displacement between the core 6 and the differential coil 7 decreases.

In the related measuring device as described above, when the relative displacement between the core 6 and differential coil 7 is small, for example, the stroke between the two is 100 μm or smaller, the measuring error in the differential transformer 5 due to the change in ambient temperature can be neglected. However, when the relative displacement between the core 6 and differential coil 7 is large, for example, the stroke between the two is about 5 mm such as in a measuring device being capable of measuring a wide range, the measuring error in the differential transformer 5 cannot be neglected.

SUMMARY OF THE INVENTION

Accordingly, an object of the present invention is to provide a differential transformer which is capable of obtaining a detection value corresponding to a relative displacement between a core and a differential coil regardless of the change in ambient temperature, and a measuring device using the same.

Briefly, according to the present invention, a differential transformer is composed of a differential coil, which includes a primary coil and two secondary coils wound on one of an inner or outer surface of a bobbin which is made of a non-magnetic substance and takes tubular form, and a core which is movably inserted in the differential coil in an axial direction and is made of a magnetic substance, to obtain a detection value corresponding to the relative displacement between the core and the differential coil. In the two secondary coils, a compound conducting wire is made by at least two conducting wires which are different from each other in a thermal coefficient of resistivity and the at least two conducting wires are connected in a predetermined manner.

Moreover, the compound conducting wire formed by the two secondary coils can only be made of a material in which the thermal coefficient of resistivity is less than $4.3 \times 10^{-3}$ $\mu\Omega\cdot\text{cm}/°\text{C}$. or negative.

A measuring device according to the present invention is composed of a pair of feelers relatively movable with respect to each other and contacted with a measured member, a differential transformer for detecting a relative displacement between the pair of feelers, a bobbin made of a non-magnetic substance which is a tubular member and fixed to one of said pair of feelers, a core movably inserted in an axial direction in said bobbin and fixed to the other of said pair of feelers, a differential coil composed of a primary and two secondary coils which are wound on one of an inner or an outer surface of said bobbin, and a compound conducting wire made by at least two conducting wires which are different from each other in a thermal coefficient of resistivity and said at least two conducting wires being connected in a predetermined manner to form said two secondary coils.

In the differential transformer as described above, when AC current is passed through the primary coil, a voltage corresponding to the relative displacement between the core and the differential coil is generated, whereby the displacement corresponding to the diameter of the workpiece can be detected. The differential transformer having the two secondary coils made of the conducting wire described above can obtain the voltage corresponding to the relative displacement between the core and the differential coil regardless of the change in ambient temperature.

Moreover, according to the present invention, a differential transformer for detecting a relative displacement between a differential coil and a core movably positioned in the differential coil, comprises a non-magnetic tubular member, and a plurality of coil means wound on the tubular member to form the differential coil, wherein at least one of the coil means is formed by at least two conducting wires, each of which has a different thermal coefficient of resistivity.

Furthermore, according to the present invention, a measuring device comprises first and second feeler means which are relatively movable with respect to each other for contacting a member to be measured, and differential transforming means for detecting a relative displacement between the first and second feeler means, wherein the differential transforming means comprises a non-magnetic tubular member which is fixed to one of the first and second feeler means, a core member movably inserted in the tubular member and fixed to the other of the first and second feeler means, and a differential coil member comprising a plurality of coil means which are wound on the tubular member, at least one of the coil means being formed by at least two conducting wires which each have a different thermal coefficient of resistivity.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 3:
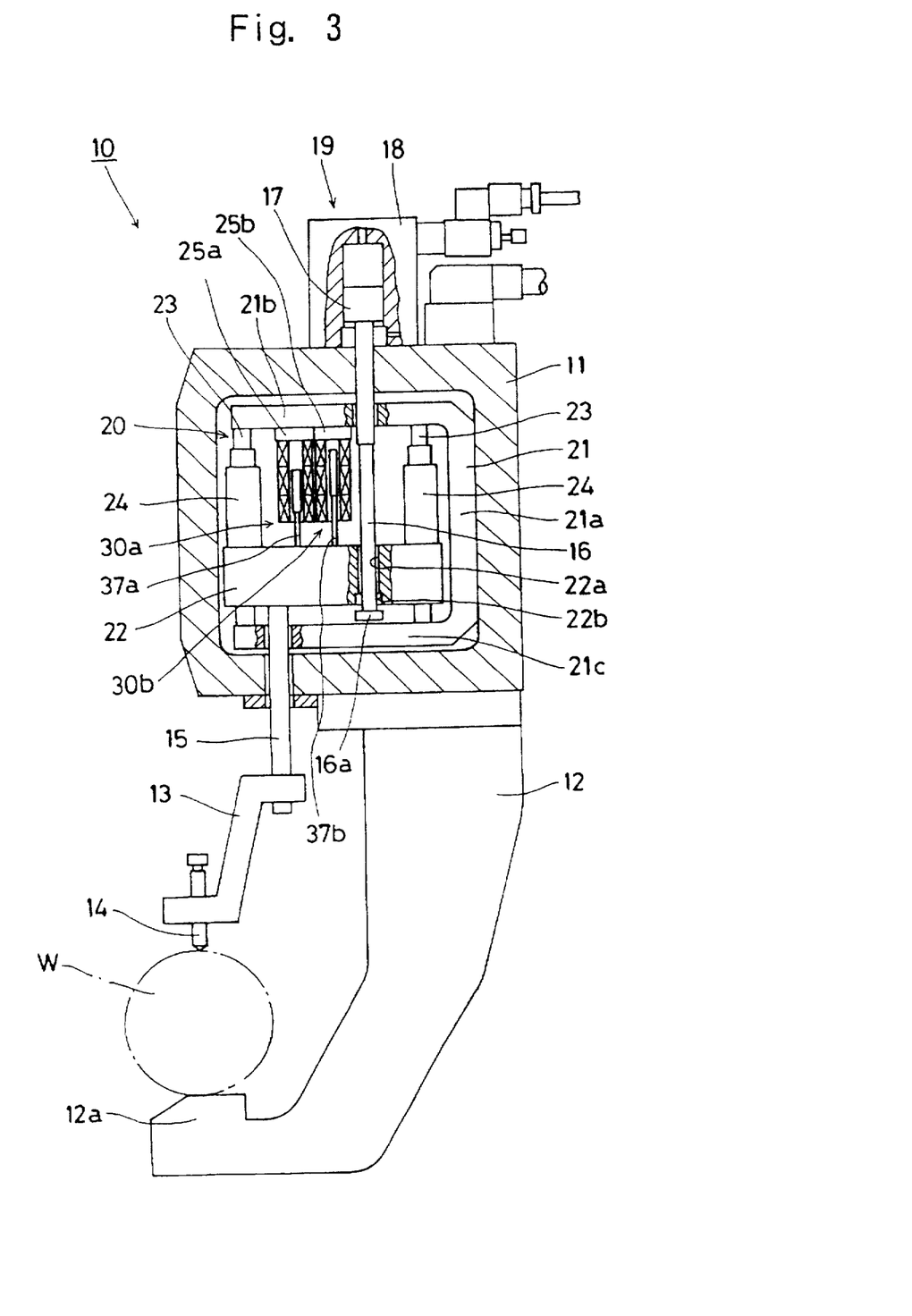
FIG. 3 shows a side cross-sectional view of a measuring device according to the present invention.

Referring now to the drawings, wherein like reference numerals designate identical or corresponding parts throughout the several views, in FIG. 3, numeral 10 is a measuring device which is capable of measuring in a wide temperature range. The measuring device 10 includes a head 11, a lower feeler 12, an upper feeler 13, a detection unit 20, and spacers 25a and 25b.

A cross-sectional view of the head 11 takes the form of a box, and the head 11 is properly installed to a machine tool (not shown). The head 11, where the detection unit 20 described below is inserted and the lower feeler 12 is fixed to a lower portion thereof, is made of aluminum which has a linear expansivity of $23.6 \times 10^{-6}/°C$.

The lower feeler 12 is a J-shaped member, on which a contact portion 12a with a workpiece W is formed. To cancel the thermal displacement caused by the change in ambient temperature, the lower feeler 12 is made of carbon steel which has a linear expansivity of $11.2 \times 10^{-6}/°C$.; this is the same as the workpiece W.

Above the contact portion 12a of the lower feeler 12, the upper feeler 13, which is made of same material as the lower feeler 12, is arranged. A contact feeler 14 contacting with an upper portion of the workpiece W is rotatably engaged on the top of the upper feeler 13 so as to be adaptable to different diameters of the workpiece W. Moreover, an end portion of the upper feeler 13 is connected with a block 22 of the detection unit 20 described below through a connecting shaft 15. The contact feeler 14 is made of chromic molybdenum steel, which has a linear expansivity of $11.2 \times 10^{-6}/°C$., equal to that of carbon steel.

The detection unit 20 disposed in the head 11 includes a base frame 21, the block 22 vertically movably supported relative to the base frame 21, and first and second differential transformers 30a and 30b formed between the base frame 21 and the block 22; the transformers 30a and 30b have different measuring ranges.

The base frame 21 is made of carbon steel similar to the lower feeler 12, and is fixed to the head 11 in a middle portion 21a thereof. In this situation, there are clearances between the head 11 and each of an upper portion 21b and a lower portion 21c of the base frame 21 so that the inside of the head 11 does not contact the upper portion 21b or the lower portion 21c.

In the base frame 21, a pair of pilot bars 23 are supported so as to connect the upper portion 21b of the base frame 21 with the lower portion 21c thereof The block 22 is arranged on the pair of pilot bars 23 via a linear bearing 24, so that the block 22 can move relative to the base frame 21.

The connecting shaft 15 is fixed to the block 22 on a lower portion thereof, and pierces the base frame 21 and the head 11. The upper feeler 13 is mounted at the end portion of the connecting shaft 15. Therefore, the upper feeler 13 can move vertically together with the block 22. In the block 22, there is formed a penetration hole 22a wherein the connecting shaft 16 is inserted. A flange member 16a is formed at an end portion of the connecting shaft 16, and engages with an enlarged diameter portion 22b of the penetration hole 22a, so that the block 22 does not drop. Moreover, a top portion of the connecting shaft 16 extends upward through the base frame 21 and the head 11, and a piston 17 is secured to the top portion of the connecting shaft 16.

At the upper portion of the head 11, there are arranged a cylinder 18, which includes a piston 17 therein, and an air cylinder 19, which is connected with a pressure air supply unit (not shown) and formed with both the piston 17 and the cylinder 18. Therefore, in the case where the connecting shaft 16 rises by driving the air cylinder 19 to urge the piston 17 upward, the flange portion 16a formed on the lower end of the connecting shaft 16 engages with the enlarged diameter portion 22b of the block 22, thereby raising the block 22. The upper feeler 13 connected to the block 22 rises as the block 22 rises, so that the workpiece W can be inserted between the lower feeler 12 and the upper feeler 13. On the other hand, when the workpiece W is inserted, the connecting shaft 16 is dropped by driving the air cylinder 19 to urge the piston 17 downward. Therefore, the block 22, which is released from engagement with the connecting shaft 16, drops by the weight of the block 22 itself. A bit of the contact feeler 14 of the upper feeler 13 stops at the position where the bit of the contact feeler 14 contacts with an outer surface of the workpiece W, whereby the diameter of the workpiece W is able to be measured.

Furthermore, the base frame 21, the block 22, the pilot bar 23, the linear bearing 24 and the connecting shaft 15 are all made of the carbon steel; that is the same material as the lower feeler 12, thus canceling the thermal displacement due to changes in ambient temperature.

Between the block 22 and the base frame 21, there are arranged a first differential transformer 30a and a second differential transformer 30b for measuring the diameter of the workpiece W. The first and second differential transformers 30a and 30b are different only in that a core splint 37b of the second differential transformer 30b is longer than a core splint 37a of the first differential transformer 30a. The remaining construction between the first and second differential transformers 30a and 30b are the same; therefore, only the first transformer 30a is explained in brief.

Figure 4:
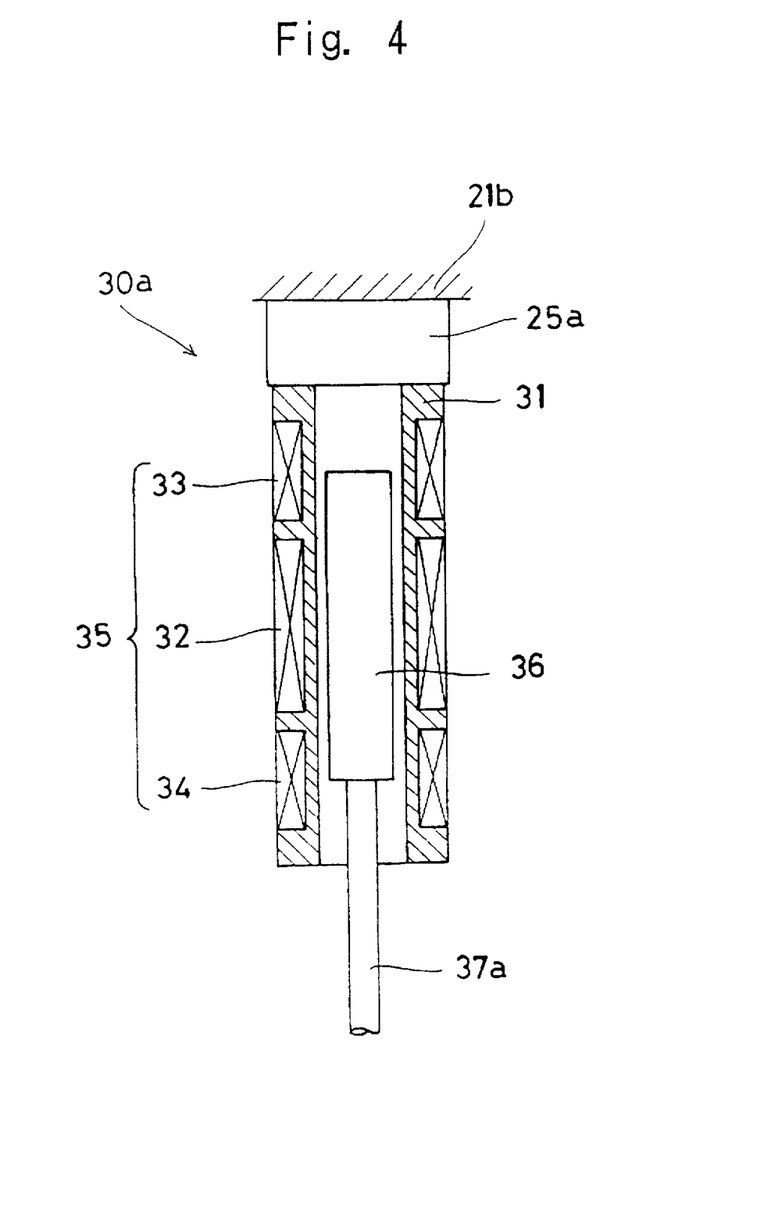
FIG. 4 is an enlarged view of a differential transformer according to the present invention.

FIG. 4 shows an enlarged view of the first differential transformer 30a which is mainly composed of a core 36 and a differential coil 35.

The core 36 is a tubular member made of Permalloy, a magnetic material, which maintains good magnetic permeability at high frequency when the core 36 of the differential transformer moves vertically. The detection level of a differential transformer using a core made of Permalloy is higher than that of a core made of other metallic materials, and the residual noise is also decreased. The core 36 is secured to the block 22 through the core splint 37a made of stainless steel, which has a linear expansivity of 17.3×10$^{-}$6/°C., so that the core 36 moves vertically relative to the block 22 in response to movement of the block 22.

The differential transformer 35 includes a bobbin 31, a primary coil 32, a first secondary coil 33 and a second secondary coil 34 which are wound around the bobbin 31 with a predetermined number of turns.

The bobbin 31 is a tubular member, and is fixed to the upper portion of the base frame 21 via the spacer 25a.

In the bobbin 31, the movable core 36 is inserted in an axial direction thereof. Moreover, on an outer surface of the bobbin 31, there are three flanges in three separate areas in the axial direction of the bobbin 31, with the first secondary coil 33, the primary coil 32 and the second secondary coil 34 being wound on the separated areas in order.

The primary coil 32 is for excitation wherein a conducting wire A (FIG. 5), which generally has a the thermal coefficient of resistivity greater than or equal to $4.3 \times 10^{-3}$ μΩ·cm/°C., is wound on a central area of the outer surface of the bobbin 31 with a predetermined number of turns. In this embodiment, an enamel-coated copper wire is used as the conducting wire A, in which the thermal coefficient of resistivity is equal to $4.3 \times 10^{-3}$ μΩ·cm/°C. from 0° C. to 100° C. Since the primary coil 32 is for excitation, it is preferred that a conducting wire A having a smaller resistivity is used.

The first and second secondary coils 33 and 34 are for detecting a differential displacement, and are each made of the conducting wire A described above and a conducting wire B (FIG. 5), which generally has a thermal coefficient of resistivity less than $4.3 \times 10^{-3}$ μΩ·cm/°C. In this embodiment, Manganin wire is used as the conducting wire B and has a thermal coefficient of resistivity from −0.03 to +0.02×10$^{-3}$ μΩ·cm/°C. in the ambient temperature range of 0° C. to 100° C. Moreover, the conducting wires A and B are connected together to create a compound wire having a predetermined ratio of lengths, and the conducting wires A and B are wound on the upper and lower areas of the outer surface of the bobbin 31 with a predetermined number of turns. Each of the secondary coils 33 and 34 is connected as shown in FIG. 5.

Figure 5:
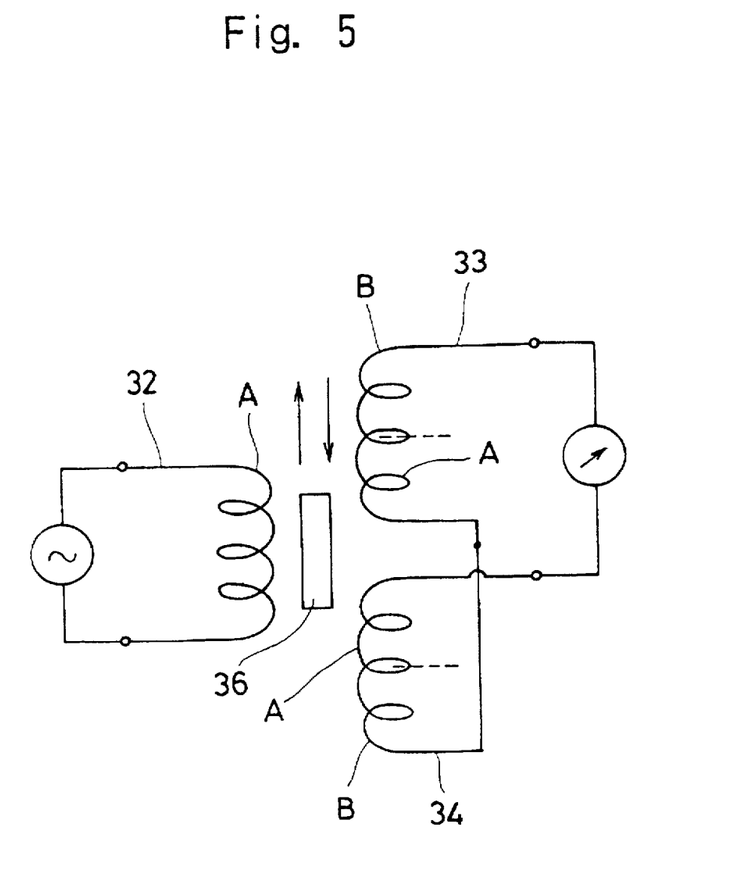
FIG. 5 is a block diagram showing a connection of the differential transformer according to the present invention.

As shown in FIG. 5, when an AC current from an alternator is applied on both ends of the primary coil 32, an induced (inductive) magnetic field is generated in the core 36 in the bobbin 31, resulting in an electromotive force corresponding to the differential displacement between the core 36 and the differential transformer 30a being generated on both ends of the secondary coils 33 and 34. Therefore, the diameter of the workpiece W can be measured by detecting the electromotive force.

In a thermal expansion, the spacer 25a is made of a material chosen to decrease the relative displacement between the core 36 and the differential coil 35 caused by the difference in thermal expansivity of the head 11, made of aluminum, and the core splint 37a, made of stainless steel. In this embodiment, the spacer 25a is made of Invar, which has a linear expansivity of $1.0 \times 10^{-6}$/°C.

The differential transformers 30a and 30b will be explained in detail. As mentioned in the related art, it is known that a resistance of metallic material changes due to a change in the ambient temperature. By experimentation, the applicant has confirmed that the differential transformer 30a composed of the first and second secondary coils 33 and 34, which uses the conducting wire B made of a metallic material having a thermal coefficient of resistivity less than $4.3 \times 10^{-3}$ μΩ·cm/°C. in the temperature range of 0° C. to 100° C., has a characteristic thermal displacement between the core 36 and the differential coil 35 due to the change in ambient temperature of the differential coil 35a, as shown in FIG. 7.

Figure 7:
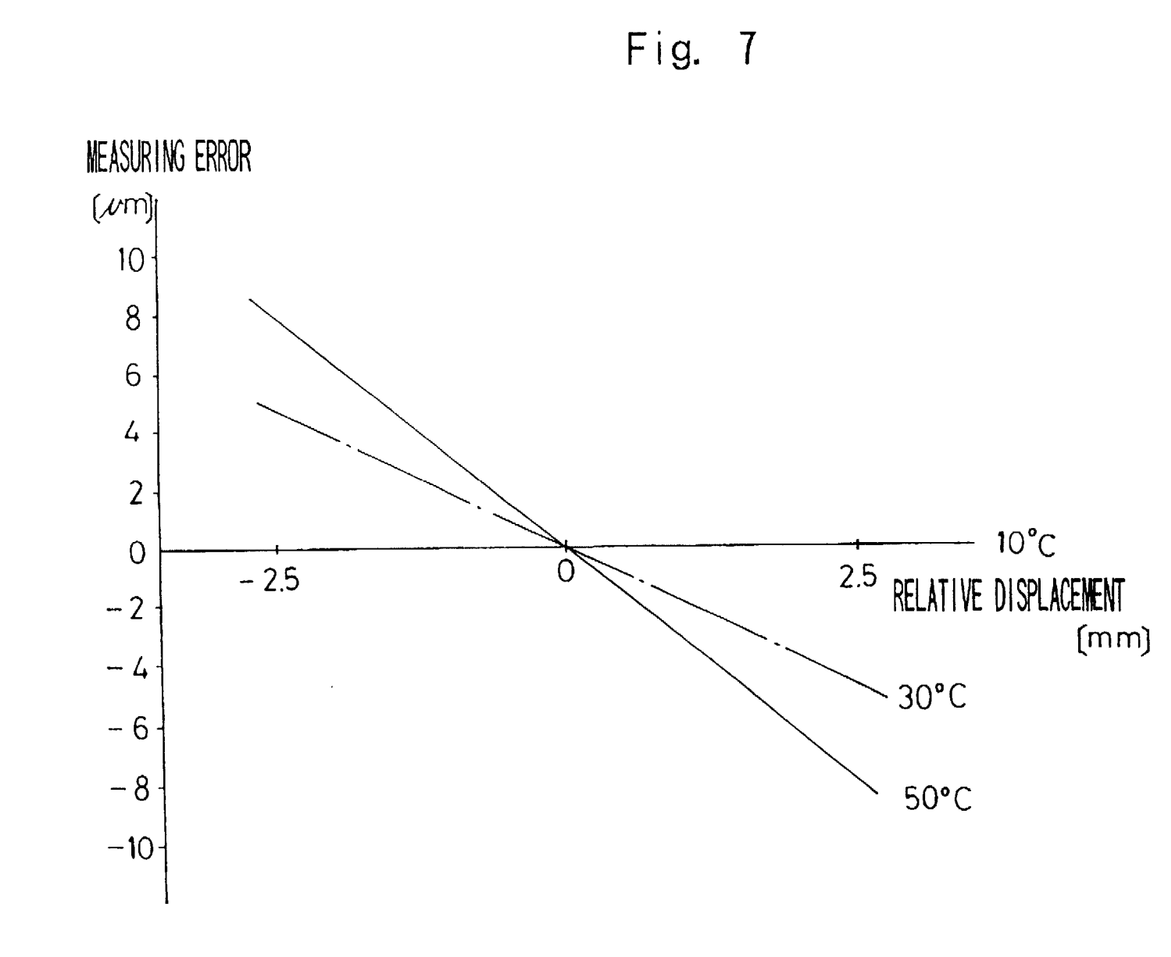
FIG. 7 is a characteristic graph showing a relationship between the relative displacement between a core and a differential coil and a measuring error in the case of two secondary coils composed of only one type of conducting wire.

Namely, FIG. 7 shows the measuring error of the differential transformer composed of the secondary coils 33 and 34 using Manganin as the conducting wire B, which has a thermal coefficient of resistivity from −0.03 to +0.02×10$^{-3}$ μΩ·cm/°C. The differential transformer generates a negative measuring error relative to a positive displacement between the core 36 and the differential coil 35 as the temperature rises.

On the other hand, the differential transformer generates a positive measuring error relative to a negative displacement. Regarding this characteristic, in the case that the secondary coils 33 and 34 are composed of the conducting wire A, which has a thermal coefficient of resistivity greater than or equal to $4.3 \times 10^{-3}$ $\mu\Omega \cdot cm/°C$. in a temperature range of 0° C. to 100° C., and the conducting wire B, in which it is less than $4.3 \times 10^{-3}$ $\mu\Omega \cdot cm/°C$. or negative it has been confirmed that the differential transformer 30 can be constructed without a measuring error due to a change in ambient temperature and the thermal displacement between the core 36 and the differential coil 35. With respect to this feature, it is required that the differential coil 35 does not expand in the axial direction. In this embodiment, the bobbin 31 is made of a ceramic that has a small coefficient of thermal expansion, so that the thermal expansion of the differential coil 35 in the axial direction is small.

The first and second transformers 30a and 30b constructed as mentioned above are arranged in parallel to each other, wherein the length of the core splint 37a is different from that of the core splint 37b. In a measurement, one of the differential transformers 30a and 30b is selectively used to measure the diameter of the workpiece W.

Accordingly, in the measuring device 10 constructed above, when the workpiece W is inserted between the upper and lower feelers 12 and 13, a voltage corresponding to the relative displacement between the core 36 and the differential coil 35 is detected to pass AC current through the primary coil 32 of a selected one of the first and second differential transformers 30a and 30b, thereby measuring the diameter of the workpiece W.

At that time, the thermal displacement between the core 36 and the differential transformer 35, which is caused by the thermal expansion of each member of the measuring device 10 due to the rising of the ambient temperature, is counterbalanced by the thermal expansion of the spacers 25a and 25b. Moreover, the differential transformers 30a and 30b do not cause a measuring error relative to the change in ambient temperature and the amount of the relative displacement between the core 36 and the differential coil 35; therefore, a voltage corresponding to the relative displacement between the core 36 and the differential coil 35, i.e., the diameter of the workpiece W, can be detected regardless of the change in ambient temperature, as mentioned above.

Figure 8:
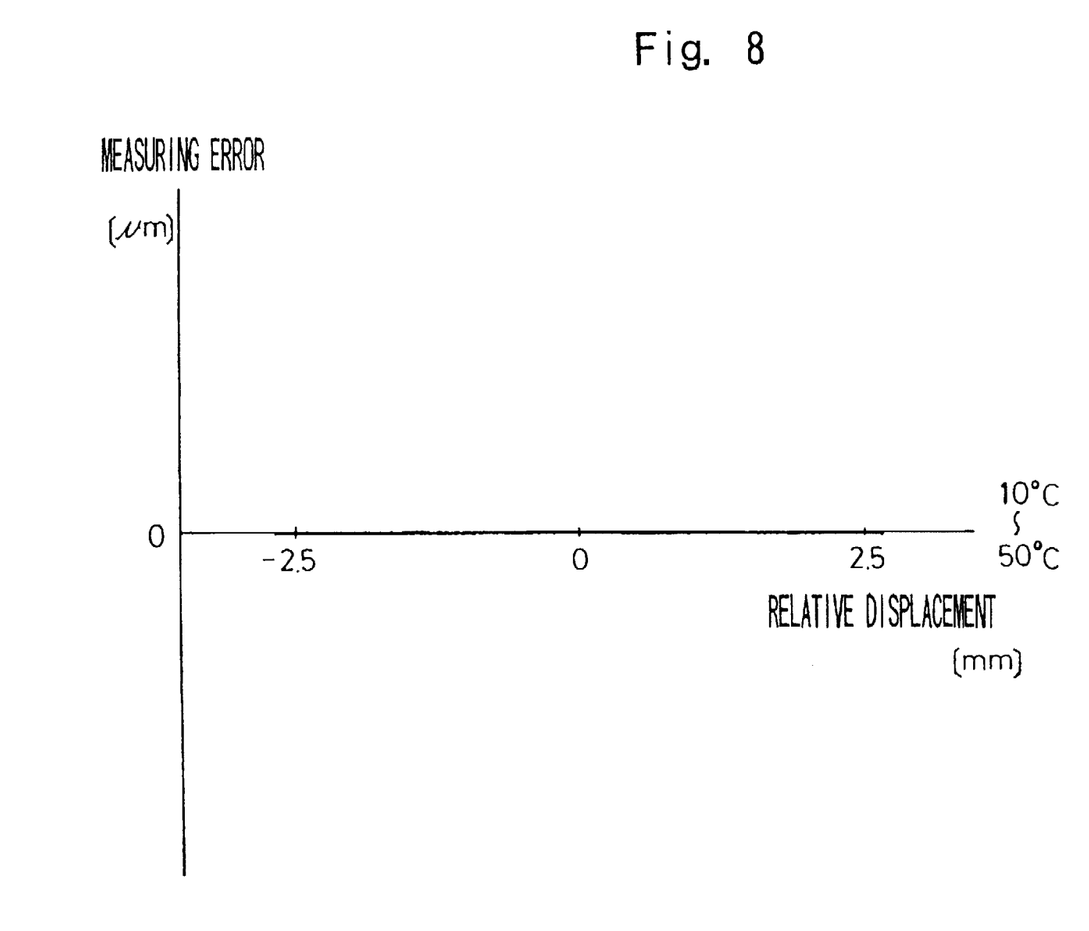
FIG. 8 is a characteristic graph showing a relationship between the relative displacement and a measuring error in an embodiment according to the present invention.

As illustrated in the graph of FIG. 8, in the present invention, there is no measuring error for the relative displacements and the ambient temperatures set forth in the graph.

As mentioned above, the measuring device 10 according to this embodiment has a feature in that the thermal displacement between the core 36 and the differential coil 35 caused by the thermal expansion of each member due to the difference of the linear expansivity can be compensated by the spacers 25a and 25b. Moreover, the measuring device 10 has a feature in that the characteristic of the differential transformer does not change when the ambient temperature changes, so that the measuring device 10 can precisely measure in a wide range regardless of the change in temperature.

Figure 6:
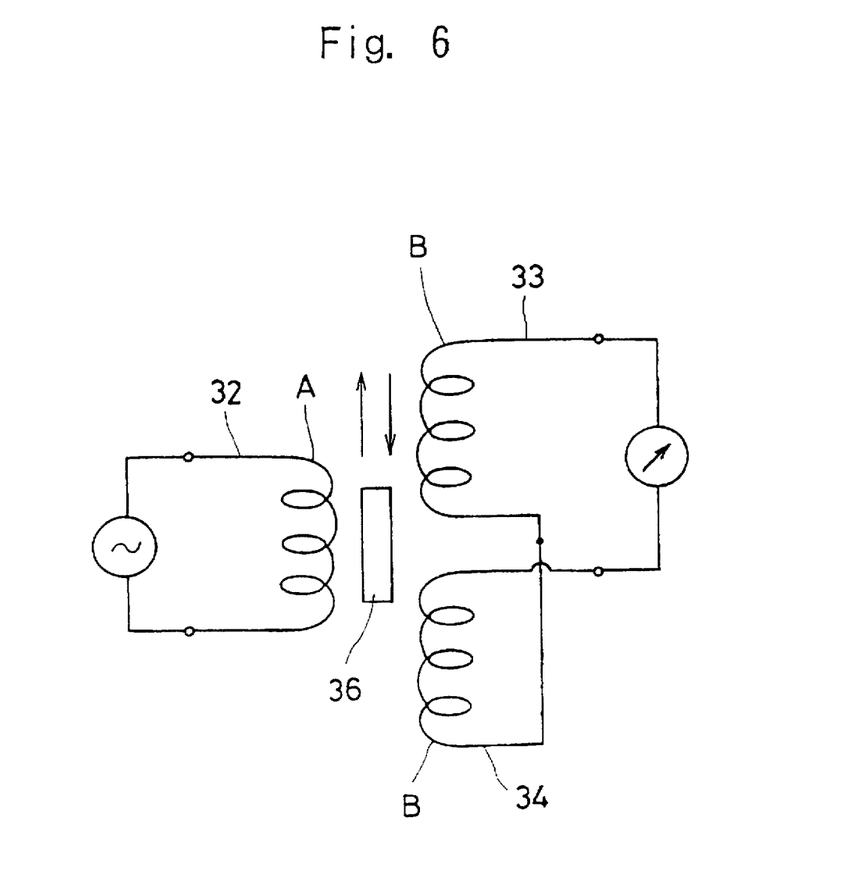
FIG. 6 is a block diagram showing another connection of the differential transformer according to the present invention.

In this embodiment, as mentioned above, the conducting wire A, which has a thermal coefficient of resistivity greater than or equal to $4.3 \times 10^{-3}$ $\mu\Omega \cdot cm/°C$., and the conducting wire B, in which it is less than $4.3 \times 10^{-3}$ $\mu\Omega \cdot cm/°C$., are wound around the outer surface of the bobbin 31 in the secondary coils 33 and 34. However, if the conducting wire B having a predetermined thermal coefficient of resistivity less than $4.3 \times 10^{-3}$ $\mu\Omega \cdot cm/°C$. is the only conducting wire used, the secondary coils 33 and 34 are then composed solely of the conducting wire B, which is wound around the outer surface of the bobbin 31, as shown in FIG. 6.

Figure 9:
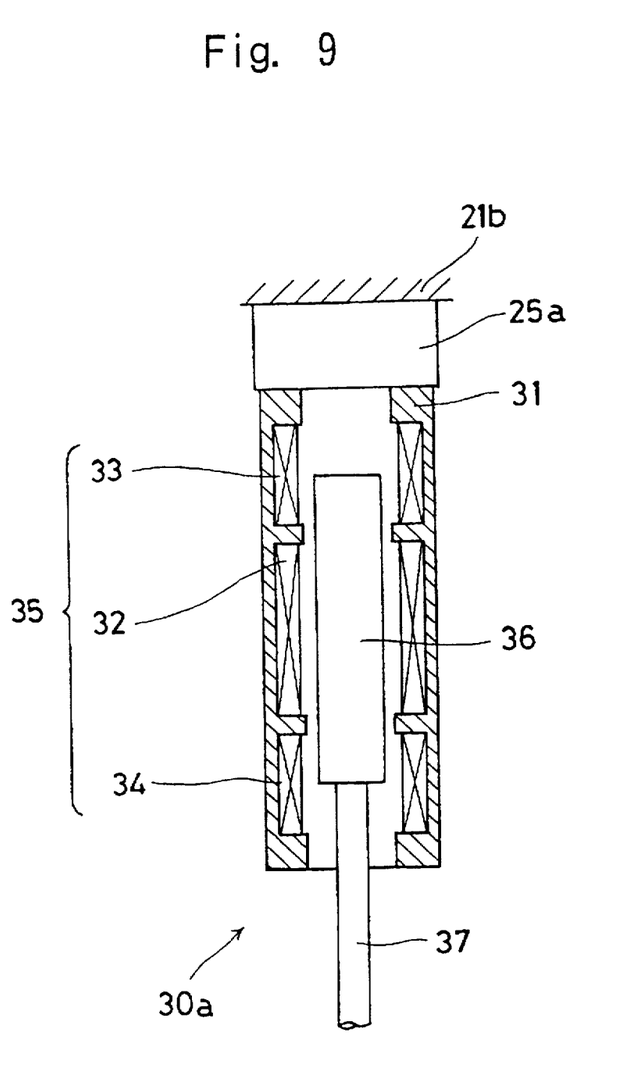
FIG. 9 is an enlarged view showing another modified embodiment of the differential transformer according to the present invention.
Figure 10:
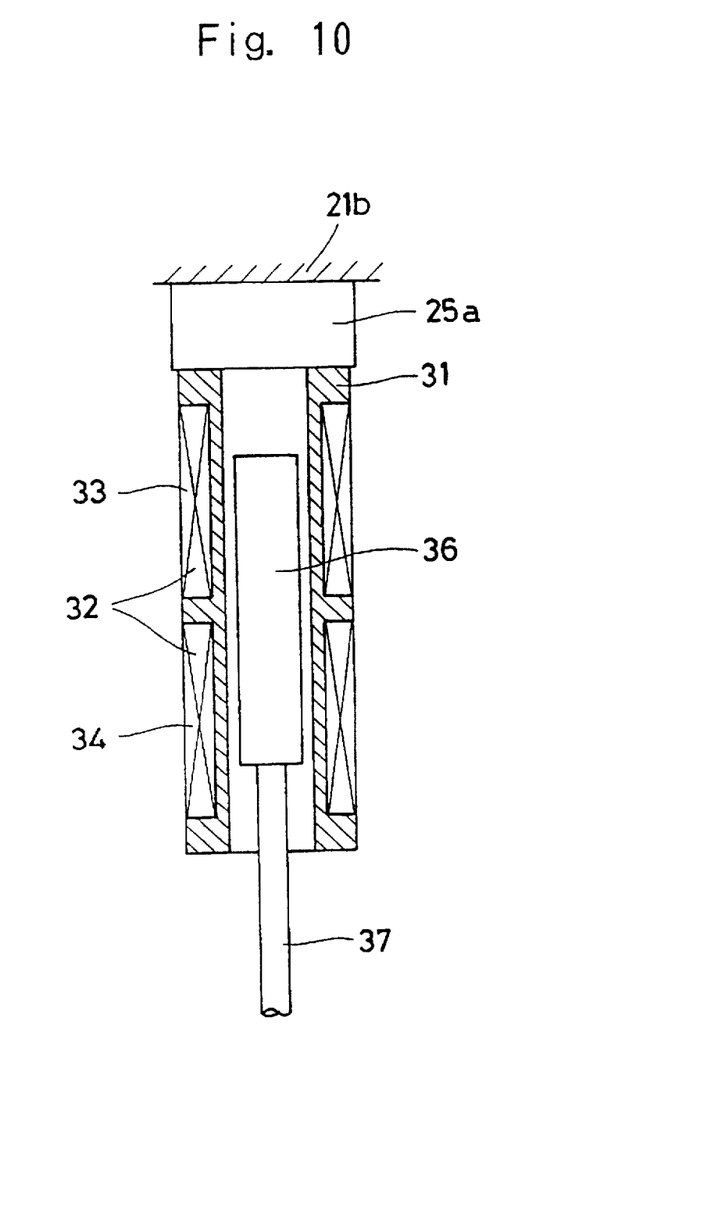
FIG. 10 is an enlarged view showing another modified embodiment of the differential transformer according to the present invention.

In the differential coil 35 of this embodiment, the primary coil 32 and the secondary coils 33 and 34 are wound around the outer surface of the bobbin 31, as shown FIG. 4. However, the primary coil 32 and the secondary coils 33 and 34 can be arranged on an inner surface of the bobbin 31, as shown in the first modified embodiment in FIG. 9. Moreover, as shown in a second modified embodiment in FIG. 10, the primary and secondary coils 32 and 33, and the primary and secondary coils 32 and 34 are wound around two separated outer surfaces of the bobbin 31, so that double differential coils 35, connected as shown in FIG. 5, are constructed, thus yielding a similar feature.

Moreover, in the embodiments as mentioned above, the measuring device for measuring a diameter of the workpiece W for use in a grinding machine is described as a measuring device using a differential transformer according to the present invention; however, the differential transformer according to the present invention can be adapted to another measuring device for measuring a displacement under a change in ambient temperature without the limitations of the aforementioned measuring device.

As mentioned above, the differential transformer according to the present invention and the measuring device using the same does not change the characteristic of the differential transformer due to changes in ambient temperature, so that a measuring value corresponding to the relative displacement between the core and the differential coil can be detected even when the ambient temperature changes the displacement, i.e., the diameter of the workpiece can be precisely measured over a wide range.

Obviously, numerous modifications and variations of the present invention are possible in light of the above teachings. It is, therefore, to be understood that within the scope of the appended claims, the invention may be practiced otherwise than as specifically described herein.

We claim:

1. A differential transformer which detects a relative displacement between a differential coil and a core that is axially movably inserted in said differential coil, the differential transformer comprising:

a bobbin made of a non-magnetic substance, said bobbin defining a tubular member;

a primary coil and first and second secondary coils which are wound on one of an inner or an outer surface of said bobbin to form said differential coil; and a compound conducting wire made by at least two conducting wires which each have a different thermal coefficient of resistivity, said at least two conducting wires being connected together to create a compound wire having a predetermined ratio of lengths to form each of said first and second secondary coils.

2. A measuring device comprising:

a pair of feelers which are relatively movable with respect to each other and are adapted to contact a measured member;

a differential transformer for detecting a relative displacement between said pair of feelers wherein said differential transformer comprises:

a bobbin made of a non-magnetic substance, said bobbin defining a tubular member and being fixed to one of said pair of feelers;

a core movably inserted in an axial direction thereof in said bobbin and fixed to the other of said pair of feelers;

a differential coil comprising a primary coil and first and second secondary coils which are wound on one of an inner or an outer surface of said bobbin; and a compound conducting wire made by at least two conducting wires which each have a different thermal coefficient of resistivity, said at least two conducting wires being connected together to create a compound wire having a predetermined ratio of lengths to form each of said first and second secondary coils.

3. A differential transformer for detecting a relative displacement between a differential coil and a core movably positioned in the differential coil, the differential transformer comprising:

a non-magnetic tubular member; and a plurality of coil means including plural detecting coil means wound on said tubular member to form said differential coil, wherein each of said detecting coil means is formed by at least two conducting wires which each have a different thermal coefficient of resistivity.

4. A measuring device comprising:

first and second feeler means, which are relatively movable with respect to each other, for contacting a member to be measured; and differential transforming means for detecting a relative displacement between said first and second feeler means wherein said differential transforming means comprises a non-magnetic tubular member which is fixed to one of said first and second feeler means;

a core member movably inserted in said tubular member and fixed to the other of said first and second feeler means; and a differential coil member comprising a plurality of coil means including plural detecting coil means which are wound on said tubular member, each of said detecting coil means being formed by at least two conducting wires which each have a different thermal coefficient of resistivity.

\* \* \* \* \*